United States Patent [19]
Ishihara et al.

[11] Patent Number: 5,982,561
[45] Date of Patent: *Nov. 9, 1999

[54] VIEWFINDER OPTICAL SYSTEM

[75] Inventors: Jun Ishihara, Kobe; Taro Shibuya, Takatsuki, both of Japan

[73] Assignee: Minolta Co., Ltd., Osaka, Japan

[ * ] Notice: This patent is subject to a terminal disclaimer.

[21] Appl. No.: 08/784,420

[22] Filed: Jan. 16, 1997

[30] Foreign Application Priority Data

Jan. 18, 1996 [JP] Japan .................................. 8-006737

[51] Int. Cl.$^6$ .......................... G02B 13/18; G03B 13/06; G03B 13/02

[52] U.S. Cl. ......................... 359/708; 359/422; 359/432; 396/373; 396/382

[58] Field of Search .................................. 359/676, 683, 359/708, 422, 432; 396/373, 382

[56] References Cited

U.S. PATENT DOCUMENTS

| | | | |
|---|---|---|---|
| 5,055,868 | 10/1991 | Itoh et al. | 359/676 |
| 5,448,411 | 9/1995 | Morooka | 359/676 |
| 5,749,008 | 5/1998 | Ishihara et al. | 396/373 |

FOREIGN PATENT DOCUMENTS

| | | |
|---|---|---|
| 337611 | 2/1991 | Japan . |
| 43103 | 1/1992 | Japan . |
| 4247417 | 9/1992 | Japan . |

*Primary Examiner*—Scott J. Sugarman
*Attorney, Agent, or Firm*—Price, Gess & Ubell

[57] ABSTRACT

A viewfinder optical system has a relay optical system and an eyepiece optical system. The relay optical system has a first, a second, and a third relay lens. The eyepiece optical system has a first and a second eyepiece lens. The first eyepiece lens, which is disposed closest to a secondary-image plane formed by the relay optical system has an aspherical surface on its secondary-image plane side.

20 Claims, 8 Drawing Sheets

I1　G1 G2 A G3　I2　G4 G5　AX E

I1　G1 G2 A G3　I2　G4 G5 G6　AX E

VIEWFINDER OPTICAL SYSTEM

BACKGROUND OF THE INVENTION

1. Field of the Invention

The present invention relates to a viewfinder optical system, and particularly to a viewfinder optical system provided with a relay optical system for use in a single-lens reflex camera or other.

2. Description of the Prior Art

In the viewfinder optical system of a typical single-lens reflex camera, a pentaprism is used as an inverting optical system. However, with the pentaprism, it is difficult to construct a high-magnification viewfinder having a sufficiently long eyepoint distance. By contrast, if a relay optical system is used as an inverting optical system, it is possible to construct a high-magnification viewfinder having a sufficiently long eyepoint distance.

However, a viewfinder optical system provided with the relay optical system has the disadvantage of being unable to achieve satisfactory matching of the pupils.

SUMMARY OF THE INVENTION

An object of the present invention is to provide a viewfinder optical system that offers satisfactory matching of pupils despite being provided with a relay optical system.

To achieve the above object, according to one aspect of the present invention, a viewfinder optical system is constituted of, from an object side to a pupil side, a relay lens system which forms an intermediate image on an intermediate image plane and has a first lens element disposed closest to the intermediate image plane, and a second lens element disposed on the pupil side of the intermediate image plane. Here, at least one aspherical surface is provided either on said first lens element or said second lens element.

Alternatively, according to another aspect of the present invention, a viewfinder optical system is constituted of, from an object side to a pupil side, a relay lens system which forms an intermediate image on an intermediate image plane and has a first lens element disposed closest to the intermediate image plane, and an eyepiece lens system which projects the intermediate image on the pupil and has a second lens element disposed closest to the intermediate image plane. Here, at least one aspherical surface is provided either on said first lens element or said second lens element.

According to still another aspect of the present invention, in either of the above viewfinder optical systems, aspherical surfaces are provided on both said first lens element and said second lens element.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
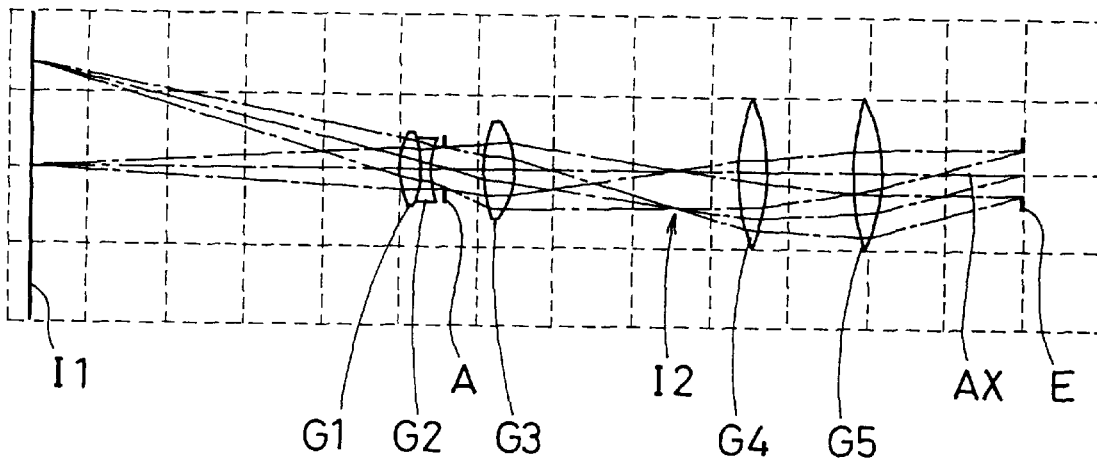
FIG. 1 is an optical path diagram of the viewfinder optical system of a first embodiment of the present invention.
Figure 2:
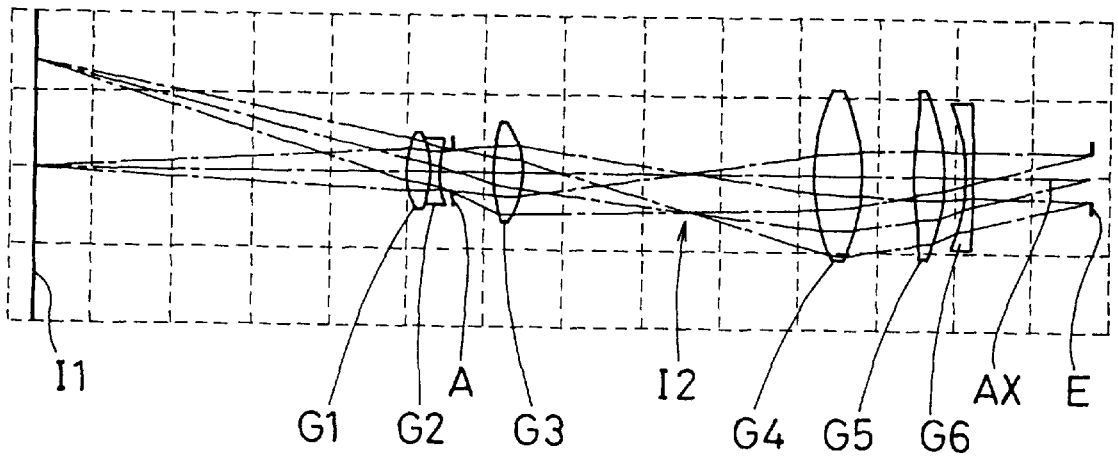
FIG. 2 is an optical path diagram of the viewfinder optical system of a second embodiment of the present invention.
Figure 3:
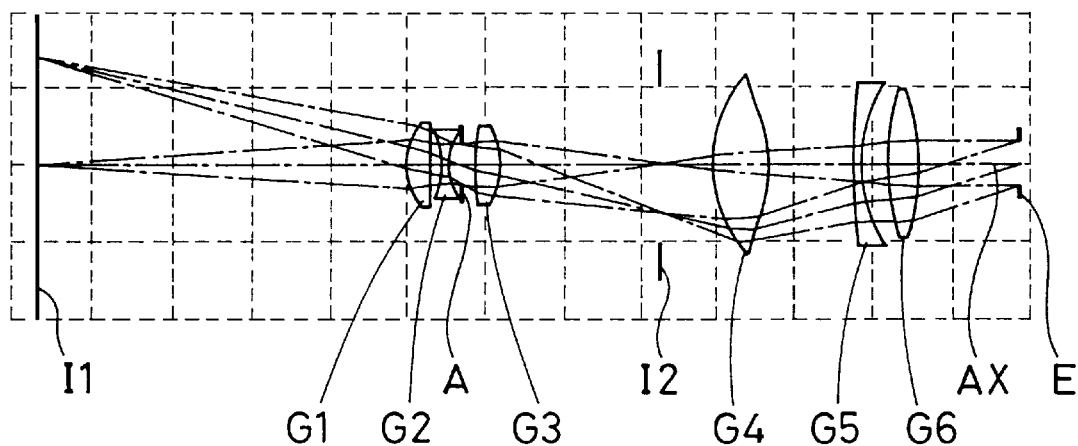
FIG. 3 is an optical path diagram of the viewfinder optical system of a third embodiment of the present invention.
Figure 4:
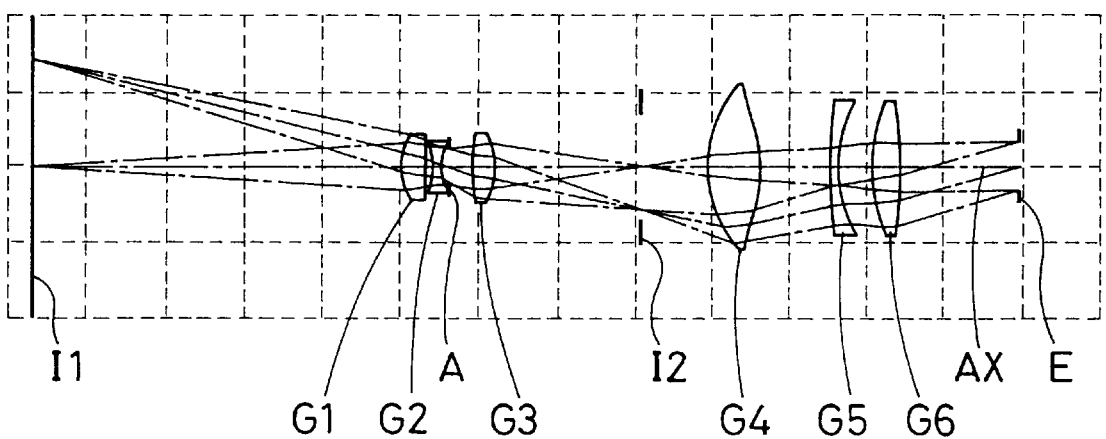
FIG. 4 is an optical path diagram of the viewfinder optical system of a fourth embodiment of the present invention.
Figure 5A:
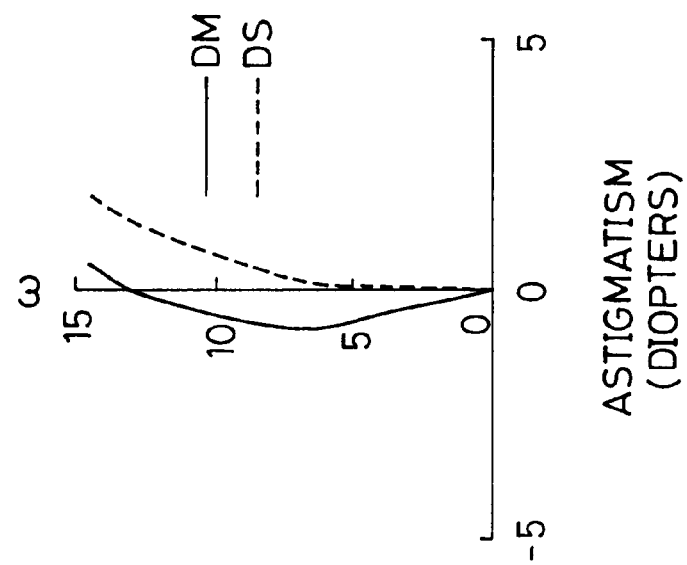
FIGS. 5A to 5C are aberration diagrams of the first embodiment.
Figure 5B:
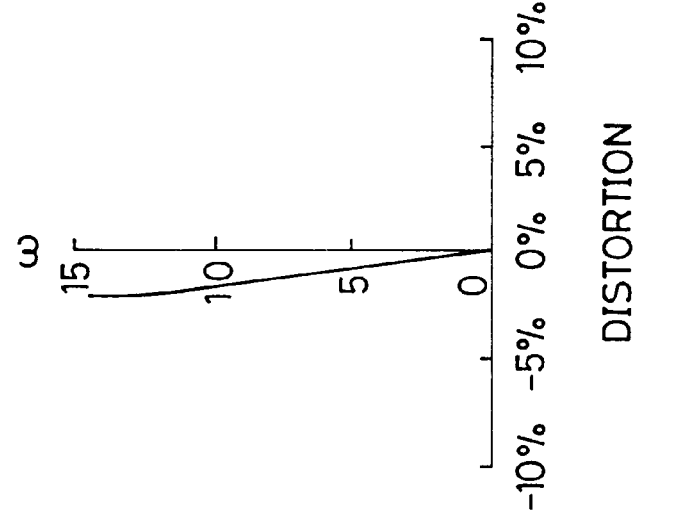
Figure 5C:
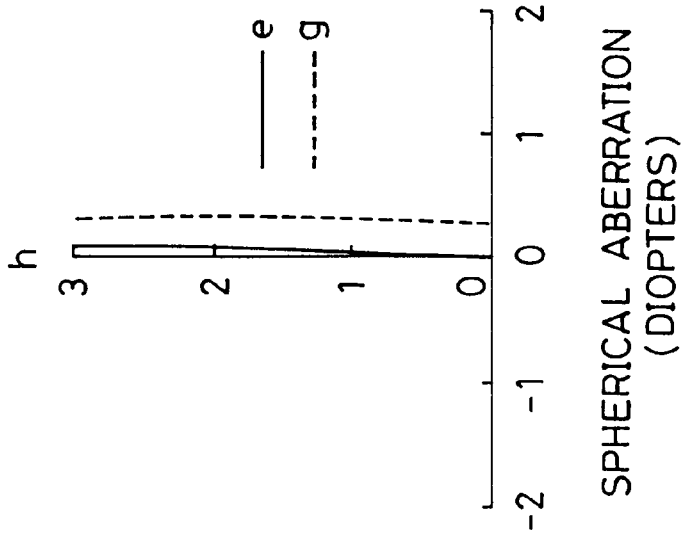
Figure 6C:
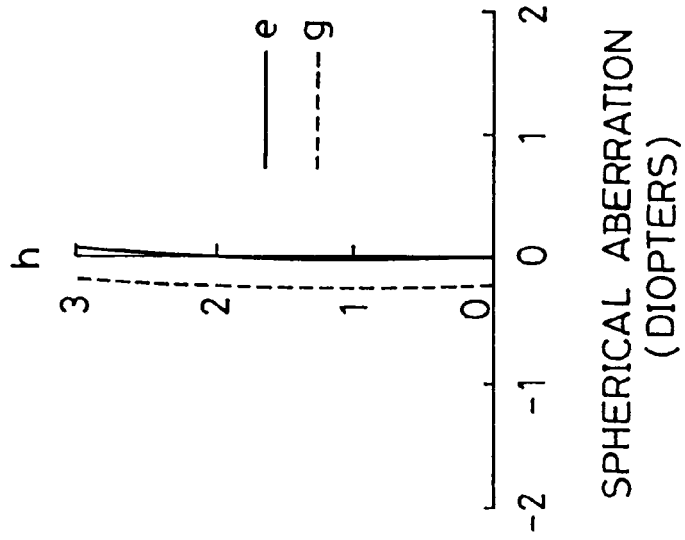
FIGS. 6A to 6C are aberration diagrams of the second embodiment.
Figure 6B:
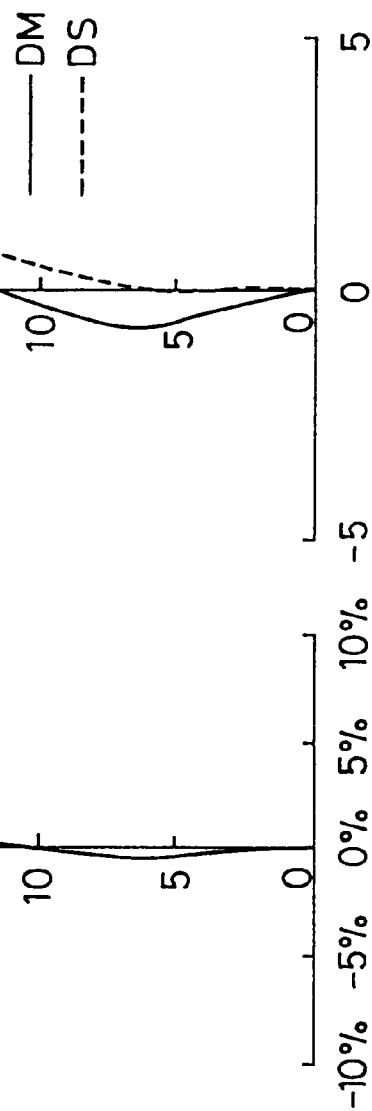
Figure 6A:
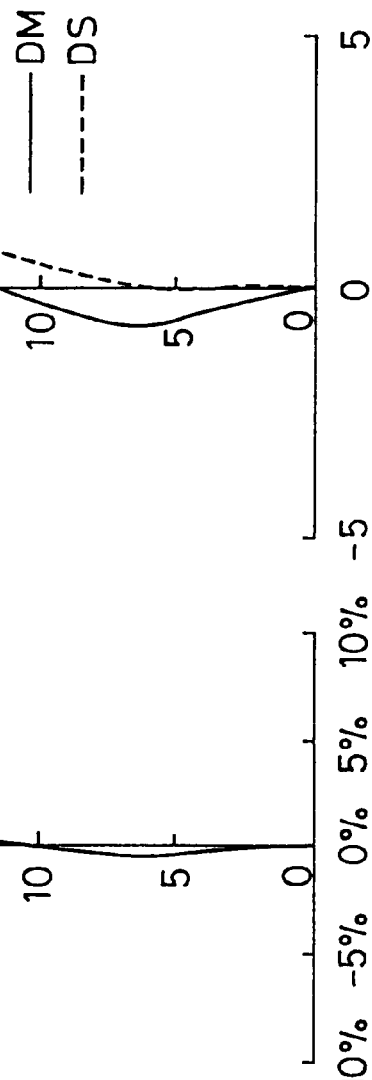
Figure 7A:
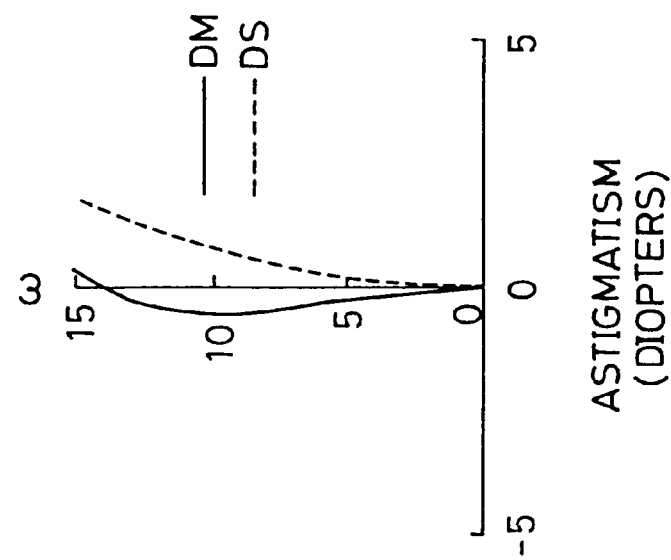
FIGS. 7A to 7C are aberration diagrams of the third embodiment.
Figure 7B:
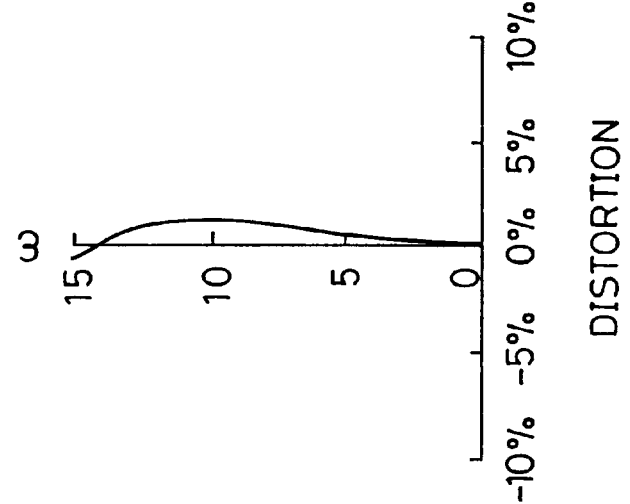
Figure 7C:
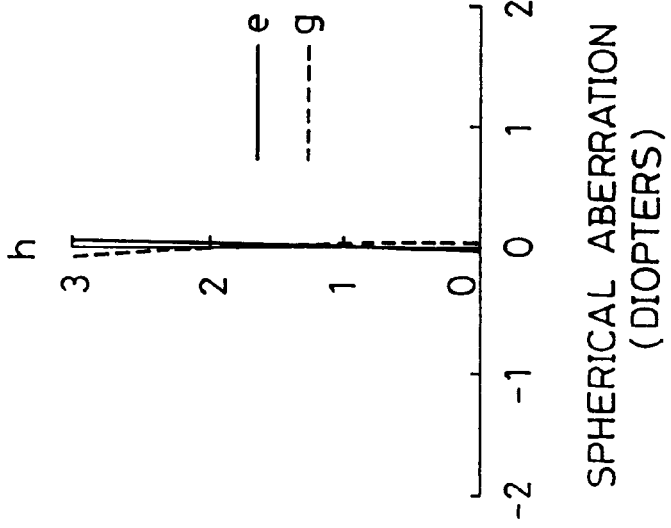
Figure 8A:
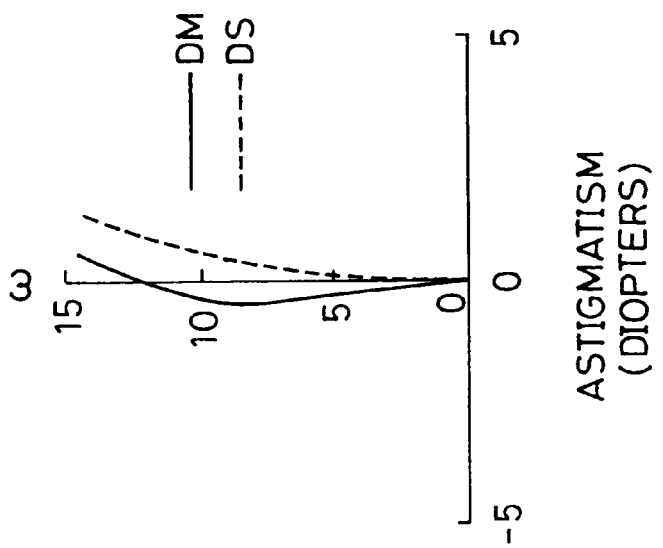
FIGS. 8A to 8C are aberration diagrams of the fourth embodiment.
Figure 8B:
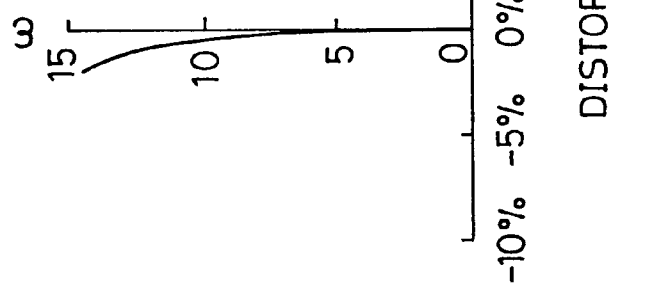
Figure 8C:
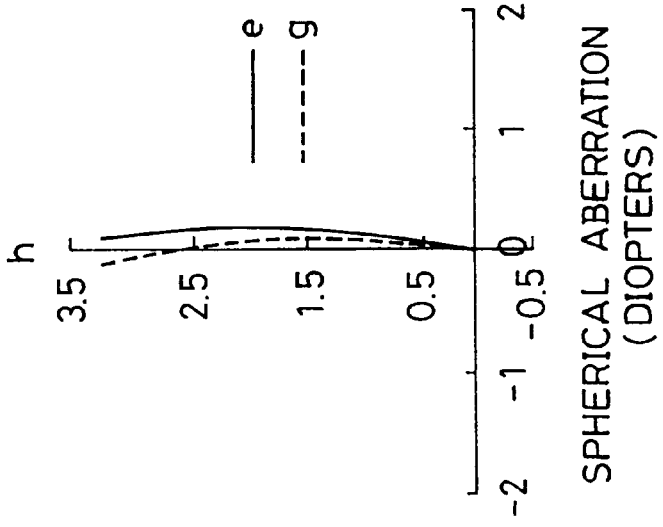

Hereinafter, viewfinder optical systems embodying the present invention will be described with reference to the drawings. FIGS. 1 to 4 are optical path diagrams of the viewfinder optical systems of the first to fourth embodiments, respectively. In the first to fourth embodiments, a relay optical system for re-imaging a primary image formed on a focal plane I1 onto a secondary-image plane I2 is constituted of a first relay lens G1 composed of a biconvex lens element, a second relay lens G2 composed of a biconcave lens element, an aperture diaphragm, and a third relay lens G3 composed of a biconvex lens element. The focal plane I1 is a primary-image plane on which an image is formed by an objective lens (not shown in the figures), and at the focal plane I1 is disposed a focusing screen.

The first embodiment is provided with a positive-positive type eyepiece optical system. Specifically, the eyepiece optical system for directing light from the above secondary-image plane I2 to the pupil E has, from the secondary-image plane I2 side, a first eyepiece lens G4 and a second eyepiece lens G5, each composed of a biconvex lens element. The second embodiment is provided with a positive-positive-negative type eyepiece optical system. Specifically, the eyepiece optical system for directing light from the above secondary-image plane I2 to the pupil E has, from the secondary-image plane I2 side, a first eyepiece lens G4 and a second eyepiece lens G5, each composed of a biconvex lens element, and a third eyepiece lens G6 composed of a negative meniscus lens element with its concave surface facing toward the secondary-image plane I2 side. The third and fourth embodiments are provided with a positive-negative-positive type eyepiece optical system. Specifically, the eyepiece optical system for directing light from the above secondary-image plane I2 to the pupil E has, from the secondary-image plane I2 side, a first eyepiece lens G4 composed of a biconvex lens element, a second eyepiece lens G5 composed of a negative meniscus lens element with its concave surface facing toward the pupil E side (with its convex surface facing toward the secondary-image plane I2 side), and a third eyepiece lens G6 composed of a biconvex lens element.

In the first embodiment, the focal plane I1 side surface of the second relay lens G2, the secondary-image plane I2 side surface of the third relay lens G3, the secondary-image plane I2 side surface of the first eyepiece lens G4, and the secondary-image plane I2 side surface of the second eyepiece lens G5 are aspherical surfaces. In the second embodiment, the focal plane I1 side surface of the second relay lens G2, the secondary-image plane I2 side surface of the third relay lens G3, the secondary-image plane I2 side surface of the first eyepiece lens G4, the secondary-image plane I2 side surface of the second eyepiece lens G5, and the secondary-image plane I2 side surface of the third eyepiece lens G6 are aspherical surfaces. In the third and fourth embodiments, the focal plane I1 side surface of the second relay lens G2, and the pupil E side surface of the first eyepiece lens G4 are aspherical surfaces.

As described above, in a viewfinder optical system of a typical single-lens reflex camera, a pentaprism is used as an inverting optical system, and this makes it difficult to construct a high-magnification viewfinder having a sufficiently long eyepoint distance. By contrast, in the first to fourth embodiments, as described above, a relay optical system of a positive-negative-positive triplet type is used as an inverting optical system, and accordingly it is possible to construct a high-magnification viewfinder having a sufficiently long eyepoint distance.

The above-mentioned eyepoint distance refers to that distance from the rear end of the eyepiece optical system to the pupil (eye) of an observer (to the eyepoint) at which the field of view in the viewfinder can be viewed without being eclipsed. Too short an eyepoint distance is inconvenient because, for example, an observer wearing glasses cannot view the entire field of view. This inconvenience is overcome by making the eyepoint distance longer, but, even in that case, the viewfinder optical system needs to be so constructed that light from the entire field of view reaches the pupil of an observer (placed at the position of the design pupil E).

As shown in FIGS. 1 to 4, in a construction where a relay optical system G1 to G3 is used as an inverting optical system, a light beam is restricted by an aperture diaphragm A disposed within the relay optical system G1 to G3. Accordingly, the exit pupil of the relay optical system G1 to G3 coincides with the entrance pupil of the eyepiece optical system G4 to G6, or G4 and G5. Moreover, the exit pupil of the eyepiece optical system G4 to G6, or G4 and G5, coincides with the design pupil E (the pupil of an observer). Therefore, to ensure that light from the entire field of view reaches the pupil of an observer without being eclipsed, much attention needs to be paid to the conjugate relationship between the pupils. However, in general, as the magnification of the viewfinder becomes higher, the deviation between the axial pupil position (for a light beam from the center of the field of view) and the off-axial pupil position (for a light beam from the periphery of the field of view) becomes greater (generally called the spherical aberration of the pupil). This deviation in the pupil positions inconveniently causes the central region of the field of view to appear bright but the peripheral region of the field of view to appear dim and shadowed.

To eliminate the above deviation in the pupil positions (i.e. to obtain better matching of pupils), in the first to fourth embodiments, the lens element disposed closest to the secondary-image plane I2 is provided with at least one aspherical surface. Specifically, within the eyepiece optical system, the eyepiece lens that is disposed closest to the secondary-image plane I2, i.e. the first eyepiece lens G4, which serves also as a condenser lens, is provided with at least one aspherical surface. The use of an aspherical surface here permits the entrance pupil to match with the exit pupil (which usually is the pupil of an observer). Thus, it is possible to suppress the spherical aberration of the pupil. To obtain still better matching of pupils, the above aspherical surface is so shaped as to have decreasing curvatures from the center to the edge.

Figure 9A:
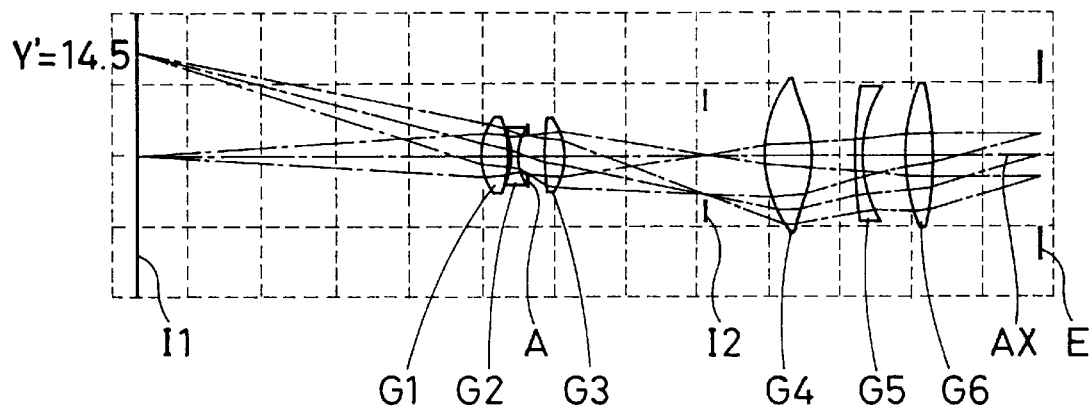
FIGS. 9A and 9B are optical path diagrams explaining matching of pupils in a viewfinder optical system embodying the present invention.
Figure 9B:
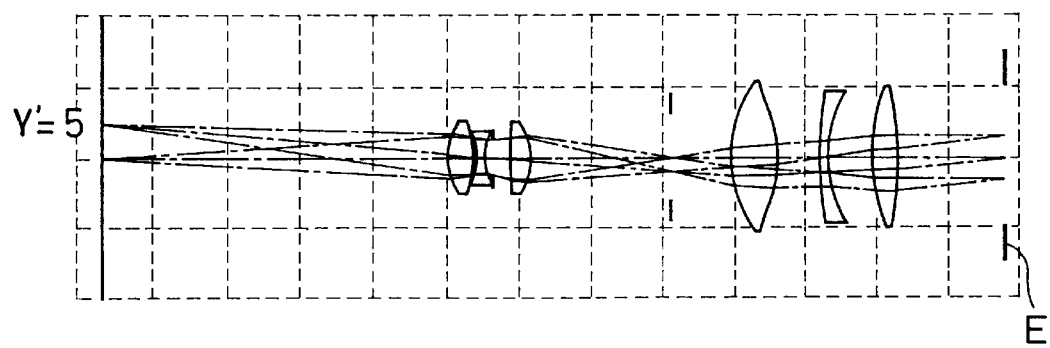

FIGS. 9A and 9B are optical path diagrams of the fourth embodiment (dioptric power: −0.99998 diopters, viewfinder magnification: −2.57883). FIG. 9A shows the optical path of a light beam from an image height of Y'=14.5 mm, and FIG. 9B shows the optical path of a light beam from an image height of Y'=5 mm. In both FIGS. 9A and 9B, an off-axial light beam and an axial light beam (a light beam at the center of the field of view) pass through the same position on a plane at the design pupil E. That is, pupils are coincident. Under this condition, even if an observer moves the eyes up and down (in a direction perpendicular to the optical axis AX), no off-axial light beam is eclipsed, and accordingly it is possible to view the entire field of view.

Figure 10A:
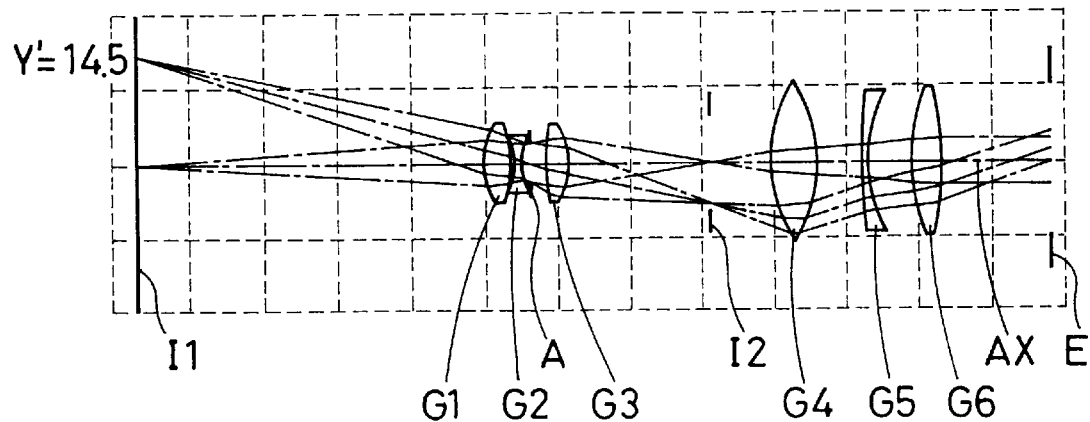
FIGS. 10A and 10B are optical path diagrams of the viewfinder optical system shown in FIGS. 9A and 9B with its aspherical surfaces replaced with spherical surfaces.
Figure 10B:
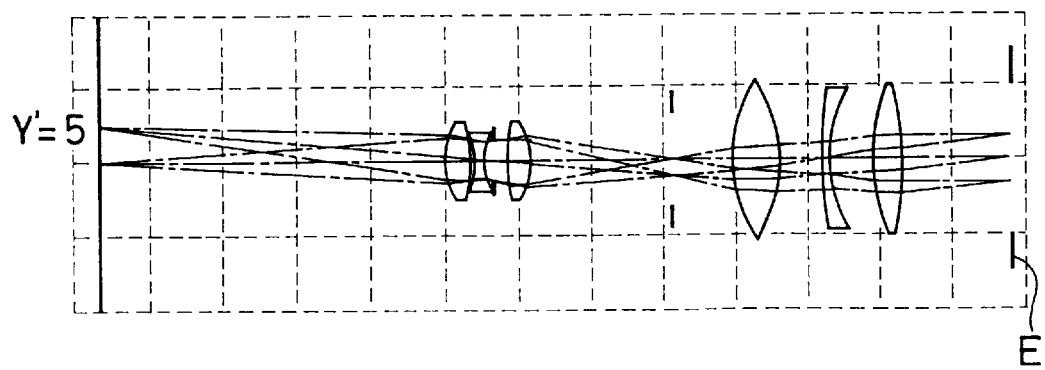

FIGS. 10A and 10B are optical path diagrams of the fourth embodiment with its aspherical surfaces replaced with spherical surfaces (dioptric power: −0.99998 diopters, viewfinder magnification: −2.57883). FIG. 10A shows the optical path of a light beam from an image height of Y'=14.5 mm, and FIG. 10B shows the optical path of a light beam from an image height of Y'=5 mm. Here, as shown in FIG. 10B, pupils are coincident for an off-axial light beam from a low image height such as Y'=5 mm, but, as shown in FIG. 10A, pupils are not coincident for an off-axial light beam from a high image height such as Y'=14.5 mm. For this reason, when the center of the pupil of an observer is located away from the optical axis AX in a direction perpendicular thereto, the region from the center of the field of view up to an image height of Y'=5 mm can be viewed without problem, but off-axial beams from an image height of Y'=14.5 mm are eclipsed and cannot be sighted. This causes the peripheral region of the field of view to appear dim and shadowed.

In the first to fourth embodiments, the pupil is designed to have a diameter of 6 mm (see the construction data of the first to fourth embodiments below). As the pupil has a larger diameter, it causes larger spherical aberration. This additional spherical aberration can be effectively corrected by replacing part of the lenses disposed near the aperture diaphragm A with aspherical lenses. Specifically, in the first to fourth embodiments, the second and third relay lenses G2 and G3 are the ones disposed near the aperture diaphragm A. Accordingly, here, at least the front-side (focal plane I1 side) surface of the second relay lens G2 is made aspherical to correct the spherical aberration. In this way, providing at least one aspherical surface in the relay optical system as well as in the eyepiece optical system not only helps to achieve better matching of pupils, but also allows the reduction of spherical aberration. Moreover, in the first to fourth embodiments, the above relay optical system has a positive-negative-positive triplet construction. This makes it possible to correct the spherical aberration more effectively.

Moreover, in the first to fourth embodiments, the first eyepiece lens G4 is so designed as to function also as a condenser lens disposed away from the secondary-image plane I2. This contributes to the improvement of image surface quality (to the reduction of curvature of field, i.e. variation of the view distance in accordance with the image height). This feature will be described in more detail below.

Generally, when an optical system having a strong positive power such as a relay optical system is combined with another optical system having a strong positive power such as an eyepiece optical system, it is necessary to use a condenser lens (which also has a strong positive power) to make pupils coincide. This is because, when no condenser lens is arranged, the peripheral region of the image plane is eclipsed and becomes dim. The condenser lens for making pupils coincide is usually disposed near the image plane. This is because, near the image plane, the condenser lens does not much affect imaging performance, and its effective diameter can be reduced to a minimum.

Moreover, in general, to reduce the size of a viewfinder optical system in which a relay optical system is used as an inverting optical system, it is necessary to shorten the total length of the viewfinder optical system. To shorten the total length of the viewfinder optical system, it is at the same time necessary to shorten also the conjugate distance of the pupils of the eyepiece (the entrance and exit pupils). Furthermore, to shorten the conjugate distance of the pupils, it is necessary to increase the power of the condenser lens. As a result, all of the optical systems constituting the viewfinder optical system (i.e. the relay optical system, condenser lens, and eyepiece optical system) are each given a strong positive power. As the power of a viewfinder optical system becomes stronger in the positive direction, its Petzval sum becomes greater in the positive direction, and this degenerates image plane quality. In short, an attempt to reduce an increasing astigmatic difference inevitably results in an increase in curvature of field, and thus results in an inclination of the image plane.

Improvement of the above-mentioned image plane quality can be most effectively achieved by optimizing power arrangement. In the first to fourth embodiments, the first eyepiece lens G4 also functions as a condenser lens disposed away from the secondary-image plane I2. This efficient power arrangement contributes to the improvement of image plane quality. Specifically, in the first to fourth embodiments, the condenser lens is disposed away from the secondary-image plane I2, so that it also functions as a part of the eyepiece optical system (i.e. as the first eyepiece lens G4). This efficient power arrangement reduces the Petzval sum, and thus alleviates the curvature of field, with the result that the image plane has less of a tendency to inclination. In addition, since the first eyepiece lens G4 that is disposed closest to the secondary-image plane I2 is disposed at a predetermined distance away from the secondary-image plane I2, even if the first eyepiece lens G4 collects pieces of dust on its lens surfaces, they do not hinder the observation.

Furthermore, selecting glass materials having the most suitable refractive indices is effective in the improvement of image plane quality. Specifically, selecting a glass material having a high refractive index for convex lenses and selecting a glass material having a low refractive index for concave lenses is effective, and is especially so with lenses having strong powers. In the first to fourth embodiments where the first eyepiece lens G4 has the strongest power, it is desirable that the first eyepiece lens G4 be made of high-refractive-index glass such as LaC8 or Nb1F (manufactured by HOYA). Note that the first eyepiece lens G4, which is realized as an aspherical lens so that satisfactory matching of pupils is obtained, may be made of plastics, with which aspherical surfaces can be formed at low cost, because it is at present difficult to form aspherical surfaces on glass pieces at low cost.

In addition to image plane quality, chromatic aberration needs to be taken into consideration. As is well-known, to correct chromatic aberration properly, it is desirable to select low-dispersion glass for convex lenses and high-dispersion glass for concave lenses.

Moreover, to realize a compact viewfinder optical system having a high magnification, the first to fourth embodiments satisfy the following conditions (1) and (2):

(1) the relay magnification is in the range from $-0.3\times$ to $-0.5\times$;

(2) the absolute value of the ratio of the focal length of the eyepiece optical system (the lens system on the downstream side of the secondary-image plane I2) to the focal length of the entire viewfinder optical system is in the range from 0.3 to 0.5.

Hereinafter, the viewfinder optical systems of the above described embodiments of the present invention will be presented more specifically, with their construction data at a dioptric power of −1 diopter, aspherical surface data, aberration diagrams, and other data.

In the construction data of each embodiment, Si (i=0, 1, 2, 3, . . . ) represents the i-th surface from the focal plane S0. In the construction data of each embodiment are listed the curvature radius of the surface Si, the axial distance between the surfaces Si and Si+1, the radius of the i-th lens from the focal plane S0 (or the radius of the pupil E), the refractive index (Ne) for e-lines of the i-th lens from the focal plane S0, the Abbe number (vd) for d-lines of the i-th lens from the focal plane S0, and the name of each optical element or other.

Moreover, a surface Si marked with an asterisk (*) is an aspherical surface. The shape of an aspherical surface is defined by formula (A) below:

$$X = C \cdot Y^2 / \{1 + 1 - \epsilon \cdot C^2 \cdot Y^2)^{1/2}\} + A4 \cdot Y^4 + A6 \cdot Y^6 + A8 \cdot Y^8 \tag{A}$$

where

X: displacement from the reference surface of the optical axis;

Y: height in the direction perpendicular to the optical axis;

C: paraxial curvature;

$\epsilon$: quadric surface parameter;

A4, A6, A8: aspherical coefficients of the fourth, sixth, and eighth orders.

Table 5 below lists the focal length of the entire viewfinder optical system, the focal length of the eyepiece optical system, the relay magnification, and the viewfinder magnification at a dioptric power of −1 diopter.

TABLE 1

<< Embodiment 1 >>

<Construction Data>

| Surface | Curvature Radius | Axial Distance | Lens Radius | Refractive Index | Abbe Number | Name |
|---|---|---|---|---|---|---|
| S0 | ∞ | | | | | Focal Plane I1 |
| | | 48.2 | | | | |
| S1 | 11.196 | | | | | |
| | | 2.8 | 5 | 1.493 | 57.82 | 1st Relay Lens G1 |
| S2 | −13.333 | | | | | |
| | | 0.4 | | | | |
| S3* | −12.915 | | | | | |
| | | 1.0 | 4.3 | 1.626 | 24.01 | 2nd Relay Lens G2 |
| S4 | 11.413 | | | | | |
| | | 1.6 | | | | |
| S5 | ∞ | | 3 | | | Aperture Diaphragm A |
| | | 5.4 | | | | |
| S6 | 20.221 | | | | | |
| | | 3.8 | 6.6 | 1.527 | 56.38 | 3rd Relay Lens G3 |
| S7* | −9.898 | | | | | |
| | | 20.844 | | | | |
| S8 | ∞ | | | | | Secondary-image plane I2 |
| | | 7.763 | | | | |

TABLE 1-continued

<< Embodiment 1 >>

| Surface | Curvature Radius | Axial Distance | Lens Radius | Refractive Index | Abbe Number | Name |
|---|---|---|---|---|---|---|
| S9* | 23.984 | | | | | |
| | | 3.5 | 10 | 1.493 | 57.82 | 1st Eyepiece Lens G4 |
| S10 | −28.571 | | | | | |
| | | 10.950 | | | | |
| S11* | 31.844 | | | | | |
| | | 3.7 | 10 | 1.493 | 57.82 | 2nd Eyepiece Lens G5 |
| S12 | −22.954 | | | | | |
| | | 18.0 | | | | |
| S13 | ∞ | | 3 (Pupil Radius) | | | Pupil E |

<Aspherical Surface Data>

S3: $\epsilon = 1.908$, $A4 = -2.19 \times 10^{-4}$, $A6 = 5.37 \times 10^{-6}$
S7: $\epsilon = 1.123$, $A4 = 1.73 \times 10^{-4}$, $A6 = 1.99 \times 10^{-6}$, $A8 = -5.67 \times 10^{-10}$
S9: $\epsilon = -10.989$
S11: $\epsilon = -34.683$, $A4 = 7.11 \times 10^{-5}$, $A6 = -6.29 \times 10^{-7}$,
$A8 = 1.61 \times 10^{-9}$

TABLE 2

<< Embodiment 2 >>

<Construction Data>

| Surface | Curvature Radius | Axial Distance | Lens Radius | Refractive Index | Abbe Number | Name |
|---|---|---|---|---|---|---|
| S0 | ∞ | | | | | Focal Plane I1 |
| | | 48.2 | | | | |
| S1 | 11.1959 | | | | | |
| | | 2.8 | 5 | 1.493 | 57.82 | 1st Relay Lens G1 |
| S2 | −13.3333 | | | | | |
| | | 0.4 | | | | |
| S3* | −12.915 | | | | | |
| | | 1 | 4.3 | 1.626 | 24.01 | 2nd Relay Lens G2 |
| S4 | 11.4129 | | | | | |
| | | 1.6 | | | | |
| S5 | ∞ | | 2.9 | | | Aperture Diaphragm A |
| | | 5.4 | | | | |
| S6 | 20.2211 | | | | | |
| | | 3.8 | 6.6 | 1.527 | 56.38 | 3rd Relay Lens G3 |
| S7* | −9.898 | | | | | |
| | | 20.8438 | | | | |
| S8 | ∞ | | | | | Secondary-image plane I2 |
| | | 16.1543 | | | | |
| S9* | 25.000 | | | | | |
| | | 6 | 11 | 1.527 | 56.38 | 1st Eyepiece Lens G4 |
| S10 | −28.5714 | | | | | |
| | | 6.80051 | | | | |
| S11* | 48.662 | | | | | |
| | | 3.8 | 11 | 1.716 | 53.94 | 2nd Eyepiece Lens G5 |
| S12 | −26.3797 | | | | | |
| | | 2.84319 | | | | |
| S13* | −21.182 | | | | | |
| | | 1 | 9.5 | 1.757 | 25.14 | 3rd Eyepiece Lens G6 |
| S14 | −134.573 | | | | | |
| | | 15 | | | | |
| S15 | ∞ | | 3 (Pupil Radius) | | | Pupil E |

TABLE 2-continued

<< Embodiment 2 >>

<Aspherical Surface Data>

S3: $\epsilon = 1.908$, $A4 = -2.19 \times 10^{-4}$, $A6 = 5.37 \times 10^{-6}$
S7: $\epsilon = 1.123$, $A4 = 1.73 \times 10^{-4}$, $A6 = 1.99 \times 10^{-6}$, $A8 = -5.67 \times 10^{-10}$
S9: $\epsilon = -0.727$
S11: $\epsilon = -84.865$, $A4 = 3.91 \times 10^{-5}$, $A6 = -6.06 \times 10^{-7}$,
$A8 = 1.21 \times 10^{-9}$
S13: $\epsilon = -1.619$, $A4 = -1.12 \times 10^{-5}$, $A6 = 2.29 \times 10^{-7}$,
$A8 = -5.53 \times 10^{-11}$

TABLE 3

<< Embodiment 3 >>

<Construction Data>

| Surface | Curvature Radius | Axial Distance | Lens Radius | Refractive Index | Abbe Number | Name |
|---|---|---|---|---|---|---|
| S0 | ∞ | | | | | Focal Plane I1 |
| | | 48.2 | | | | |
| S1 | 8.367 | | | | | |
| | | 3.2 | 5 | 1.700 | 56.47 | 1st Relay Lens G1 |
| S2 | −76.191 | | | | | |
| | | 1.3 | | | | |
| S3* | −11.922 | | | | | |
| | | 1.0 | 5 | 1.588 | 30.36 | 2nd Relay Lens G2 |
| S4 | 6.470 | | | | | |
| | | 3.6 | | | | |
| S5 | ∞ | | 2.7 | | | Aperture Diaphragm A |
| | | 0.0 | | | | |
| S6 | 35.739 | | | | | |
| | | 3.1 | 5.1 | 1.758 | 51.57 | 3rd Relay Lens G3 |
| S7 | −10.981 | | | | | |
| | | 20.312 | | | | |
| S8 | ∞ | | | | | Secondary-image plane I2 |
| | | 7.188 | | | | |
| S9 | 18.454 | | | | | |
| | | 7.2 | 11.5 | 1.527 | 56.38 | 1st Eyepiece Lens G4 |
| S10* | −15.463 | | | | | |
| | | 11.000 | | | | |
| S11 | 111.686 | | | | | |
| | | 1.0 | 9.5 | 1.843 | 21.00 | 2nd Eyepiece Lens G5 |
| S12 | 19.943 | | | | | |
| | | 3.3 | | | | |
| S13 | 31.126 | | | | | |
| | | 3.8 | 9.5 | 1.758 | 51.57 | 3rd Eyepiece Lens G6 |
| S14 | −31.126 | | | | | |
| | | 13.0 | | | | |
| S15 | ∞ | | 3 (Pupil Radius) | | | Pupil E |

<Aspherical Surface Data>

S3: $\epsilon = 1.000$, $A4 = -1.45 \times 10^{-4}$, $A6 = 1.11 \times 10^{-5}$
S10 : $\epsilon = 1.000$, $A4 = 9.70 \times 10^{-5}$, $A6 = 2.73 \times 10^{-7}$

TABLE 4

<< Embodiment 4 >>

<Construction Data>

| Surface | Curvature Radius | Axial Distance | Lens Radius | Refractive Index | Abbe Number | Name |
|---|---|---|---|---|---|---|
| S0 | ∞ | | | | | Focal Plane I1 |
| | | 46.8 | | | | |
| S1 | 7.811 | | | | | |
| | | 3.4 | 5 | 1.716 | 53.94 | 1st Relay Lens G1 |
| S2 | −30.333 | | | | | |
| | | 0.8 | | | | |
| S3* | −10.315 | | | | | |
| | | 1.0 | 5 | 1.588 | 30.36 | 2nd Relay Lens G2 |
| S4 | 5.498 | | | | | |
| | | 0.8 | | | | |
| S5 | ∞ | | 2.6 | | | Aperture Diaphragm A |
| | | 3.4 | | | | |
| S6 | 32.114 | | | | | |
| | | 2.8 | 5.1 | 1.716 | 53.94 | 3rd Relay Lens G3 |
| S7 | −10.085 | | | | | |
| | | 18.259 | | | | |
| S8 | ∞ | | | | | Secondary-image plane I2 |
| | | 9.141 | | | | |
| S9 | 16.952 | | | | | |
| | | 6.8 | 11.2 | 1.527 | 56.38 | 1st Eyepiece Lens G4 |
| S10* | −17.045 | | | | | |
| | | 9.002 | | | | |
| S11 | 91.881 | | | | | |
| | | 1.0 | 9.5 | 1.843 | 21.00 | 2nd Eyepiece Lens G5 |
| S12 | 19.106 | | | | | |
| | | 4.4 | | | | |
| S13 | 25.007 | | | | | |
| | | 3.8 | 9.5 | 1.716 | 53.94 | 3rd Eyepiece Lens G6 |
| S14 | −47.427 | | | | | |
| | | 15.0 | | | | |
| S15 | ∞ | | 3.3 (Pupil Radius) | | | Pupil E |

<Aspherical Surface Data>

S3: $\epsilon = -0.600$, $A4 = -2.70 \times 10^{-4}$, $A6 = 1.32 \times 10^{-5}$
S10: $\epsilon = -0.900$, $A4 = 6.10 \times 10^{-5}$, $A6 = 1.20 \times 10^{-7}$

TABLE 5

<< Focal Lengths and Magnifications >>

| | Emb. 1 | Emb. 2 | Emb. 3 | Emb. 4 |
|---|---|---|---|---|
| Focal Length of the Entire System | −53.78 | −57.96 | −46.90 | −50.79 |
| Focal Length of the Eyepiece Optical System | 18.25 | 19.50 | 20.00 | 20.00 |
| Relay Magnification | −0.36 | −0.36 | −0.45 | −0.42 |
| Viewfinder Magnification | −2.49858 | −2.48346 | −2.81574 | −2.60329 |

FIGS. 5A to 5C, 6A to 6C, 7A to 7C, and 8A to 8C show aberration in the first to fourth embodiments, respectively, at a dioptric power of −1 diopter. FIGS. 5A to 8A show spherical aberration, FIGS. 5B to 8B show distortion, and FIG. 5C to 8C show astigmatism. In these aberration diagrams, a solid line (e) represents aberration for e-lines, a broken line (g) represents aberration for g-lines, and a broken line (DM) and a solid line (DS) represent astigmatism on the meridional and sagittal planes, respectively. Note that h represents the radius of the pupil E, and ω represents half the angle of view.

As described above, according to the present invention, a viewfinder optical system provided with a relay optical system offers satisfactory matching of pupils, owing to an aspherical surface provided on a lens disposed nearest to the secondary-image plane.

What is claimed is:

1. A viewfinder optical system comprising:
    a relay lens system which re-forms a primary image as a secondary image on a secondary image plane; and
    a first lens element included in said relay lens system and disposed closest to the secondary image plane, said first lens element having at least one aspherical surface.

2. A viewfinder optical system as claimed in claim 1, wherein said aspherical surface is so shaped as to have decreasing curvatures from center to an edge.

3. A viewfinder optical system as claimed in claim 1, wherein said relay lens system comprises, from an object side, a positive lens element, a negative lens element and said first lens element, said first lens element having a positive refractive power.

4. A viewfinder optical system as claimed in claim 3, wherein an aspherical surface is provided on either of said positive or said negative lens elements.

5. A viewfinder optical system as claimed in claim 1, wherein a relay magnification of said relay lens system is in a range from −0.3× to −0.5×.

6. A viewfinder optical system comprising, from an object side to a pupil side:
    a relay lens system which re-forms a primary image as a secondary image on a secondary image plane;
    a first lens element included in said relay lens system and disposed closest to the secondary image plane; and
    a second lens element disposed on the pupil side of the secondary image plane,
    wherein aspherical surfaces are provided on both said first lens element and said second lens element.

7. A viewfinder optical system as claimed in claim 6, wherein said aspherical surface is so shaped as to have decreasing curvatures from center to an edge.

8. A viewfinder optical system as claimed in claim 6, wherein said relay lens system comprises, from an object side, a positive lens element, a negative lens element and said first lens element, said first lens element having a positive refractive power.

9. A viewfinder optical system as claimed in claim 8, wherein an aspherical surface is provided on either of said positive or said negative lens elements.

10. A viewfinder optical system as claimed in claim 6, wherein said second lens element is disposed at a predetermined distance away from the intermediate image plane.

11. A viewfinder optical system as claimed in claim 6, wherein a relay magnification of said relay lens system is in a range from −0.3× to −0.5×.

12. A viewfinder optical system as claimed in claim 6, wherein an absolute value of a ratio of a focal length of said eyepiece lens system to a focal length of the viewfinder optical system as a whole is a range from 0.3 to 0.5.

13. A viewfinder optical system comprising, from an object side to a pupil side:
    a relay lens system which re-forms a primary image as a secondary image on a secondary image plane;
    a first lens element included in said relay lens system and disposed closest to the secondary image plane;

an eyepiece lens system which projects the secondary image on the pupil; and a second lens element included in said eyepiece lens system and disposed on the pupil side of the secondary image plane, wherein aspherical surfaces are provided on both said first lens element and said second lens element.

14. A viewfinder optical system comprising, from an object side to a pupil side:

a relay lens system of a triplet configuration having a first lens element of a positive power, a second lens element of a negative power, and a third lens element of a positive power;

an aperture stop positioned between the second lens element and the third lens element, wherein an intermediate image is formed on the image side of the third lens element; and an eyepiece lens system having a plurality of lens elements, including a first object side lens element, positioned after the intermediate image to project the intermediate image on an exit pupil, wherein at least one aspherical surface is provided on one of the relay lens system third lens element and the eyepiece lens system first object side lens element.

15. The viewfinder optical system as claimed in claim 14, wherein the following condition is met:

$$.3 \leq \left| \frac{fe}{fs} \right| \leq .5$$

wherein $fe$ is the focal length of the eyepiece lens system, and $fs$ is the focal length of the entire viewfinder optical system.

16. A viewfinder optical system as claimed in claim 14, wherein the aperture stop is positioned to match an exit pupil of the relay lens system with an entrance pupil of the eyepiece lens system.

17. A viewfinder optical system as claimed in claim 14, wherein an image side of the third lens element of the relay lens system and an object side of the first object side lens element of the eyepiece lens system have aspherical surfaces.

18. A viewfinder optical system as claimed in claim 17, wherein the first object side lens element is a condenser lens.

19. A viewfinder optical system as claimed in claim 18, wherein the first object side lens element is glass.

20. A viewfinder optical system as claimed in claim 14, wherein a relay magnification of the relay lens system is in a range from –0.3× to –0.5×.

* * * * *